(12) United States Patent
Kherroubi et al.

(10) Patent No.: US 10,393,913 B2
(45) Date of Patent: Aug. 27, 2019

(54) PETROPHYSICAL INVERSIONS SYSTEMS AND METHODS FIELD

(71) Applicant: SCHLUMBERGER TECHNOLOGY CORPORATION, Sugar Land, TX (US)

(72) Inventors: Josselin Kherroubi, Paris (FR); Ollivier Faivre, Paris (FR); Jean-Marc Donadille, Chatillon (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 509 days.

(21) Appl. No.: 14/784,668

(22) PCT Filed: Apr. 17, 2014

(86) PCT No.: PCT/US2014/034544
§ 371 (c)(1),
(2) Date: Oct. 15, 2015

(87) PCT Pub. No.: WO2014/172563
PCT Pub. Date: Oct. 23, 2014

(65) Prior Publication Data
US 2016/0061987 A1    Mar. 3, 2016

(30) Foreign Application Priority Data

Apr. 19, 2013 (EP) .................................... 13305521

(51) Int. Cl.
*G01V 3/38* (2006.01)
*G01V 3/18* (2006.01)

(52) U.S. Cl.
CPC . *G01V 3/38* (2013.01); *G01V 3/18* (2013.01)

(58) Field of Classification Search
CPC ....................................................... G01V 1/282
(Continued)

(56) References Cited

U.S. PATENT DOCUMENTS 5,706,194 A * 1/1998 Neff ...................... G01V 1/282
                                                                    702/14
5,798,982 A * 8/1998 He ........................ G01V 1/306
                                                                    367/28

(Continued)

FOREIGN PATENT DOCUMENTS

| EP | 0840141 A2 | 5/1998 |
| GB | 2318196 A | 4/1998 |
| WO | 2012101607 A2 | 8/2012 |

OTHER PUBLICATIONS

International Search Report and Written Opinion issued in corresponding International Application No. PCT/US2014/034544 dated Jul. 4, 2014.
Hizem et al., "Dielectric Dispersion: A New Wireline Petrophysical Measurement". SPE Annual Technical Conference and Exhibition, Denver, CO (USA), Sep. 21-24, 2008.

(Continued)

*Primary Examiner* — Mischita L Henson
(74) *Attorney, Agent, or Firm* — Sara K. M. Hinkley

(57) ABSTRACT

The disclosure provides methods and systems for evaluating formation geometry and petrophysical properties directly from raw electromagnetic measurements. The methods involve using a downhole tool to measure a property of a formation at multiple depths of investigation and calculating geometry and petrophysical property information by direct inversion from raw measurements acquired by the tool. The system includes a tool for measuring a formation property at different depths of investigation and a processor for calculating geometry and petrophysical information by direct inversion from the raw measurements acquired by the tool.

11 Claims, 3 Drawing Sheets

(58) Field of Classification Search
USPC .............. 702/7, 12, 13, 14, 15, 16; 367/28; 703/10
See application file for complete search history.

(56) References Cited

U.S. PATENT DOCUMENTS

| | | | | |
|---|---|---|---|---|
| 5,812,068 | A * | 9/1998 | Wisler | E21B 7/068 |
| | | | | 175/40 |
| 5,883,515 | A | 3/1999 | Strack et al. | |
| 5,900,733 | A * | 5/1999 | Wu | G01V 3/30 |
| | | | | 324/338 |
| 7,376,514 | B2 | 5/2008 | Habashy et al. | |
| 2006/0055403 | A1* | 3/2006 | Freedman | G01V 1/44 |
| | | | | 324/303 |
| 2009/0043554 | A1 | 2/2009 | Horne et al. | |
| 2010/0307741 | A1* | 12/2010 | Mosse | G01V 3/30 |
| | | | | 166/250.01 |
| 2013/0297273 | A1* | 11/2013 | Altundas | G01V 1/282 |
| | | | | 703/10 |
| 2018/0058211 | A1* | 3/2018 | Liang | G01V 11/00 |
| 2018/0203151 | A1* | 7/2018 | Kouchmeshky | G01V 3/38 |

OTHER PUBLICATIONS

Mossé, et al., "Dielectric dispersion logging in heavy oil: A case study from the Orinoco belt", SPWLA 50th Annual Logging Symposium, The Woodlands, TX (USA), Jun. 21-24, 2009.

* cited by examiner

PETROPHYSICAL INVERSIONS SYSTEMS AND METHODS FIELD

FIELD

The present disclosure relates to systems and methods for oil and gas exploration and production. The present disclosure also relates to systems and methods for interpreting subterranean formation evaluation measurements.

BACKGROUND

Oil prices continue to rise in part because the demand for oil continues to grow, while stable sources of oil are becoming scarcer. Oil companies continue to develop new tools for generating data from boreholes with the hope of leveraging such data by converting it into meaningful information that may lead to improved production, reduced costs, and/or streamlined operations.

Logging tools are a major component of the wireline business and an increasing part of the logging while drilling business. While the logging tools provide measurements containing abundant indirect data about the subsurface, it remains a challenge to extract the geological and petrophysical knowledge contained therein, especially in a cost-effective and time-efficient manner. For example, radial inversion can be used to generate a model of the formation invasion profile. However, radial processing can be time-intensive and may involve two sequential steps, a first step inverting for the electromagnetic properties from the raw measurements, and as second step inverting for petrophysical properties from the previously inverted electromagnetic properties.

SUMMARY

The present disclosure relates to methods and systems for analyzing raw data from borehole logging tools. In some embodiments, the methods relate to analyzing data generated by logging tools which take measurements of a subterranean formation at different depths of investigation. In some embodiments, the systems include a downhole tool for logging data relating to a property of a subterranean formation at different depths of investigation and a processor for computing the geometry and/or petrophysical information directly from the raw logged data.

In some embodiments the methods comprise using a logging tool to measure data relating to a formation property (one or more formation properties) at different depths of investigation and performing a direct inversion of the geometry and petrophysical information of the formation directly from the raw measurements. In some embodiments, the depths of investigation are radial depths of investigation. In some embodiments, performing a direct inversion involves calculating a direct inversion according to formulas (1), (2) and (3) as follows:

$$\text{Direct Inversion:} \min_{Petro\ properties, Geometry} \|(EM\ measurements) - (f_{EM}of_{petro})(Petro\ properties, Geometry)\|^2 \quad (1)$$

wherein:

$$\text{Geometry:} \{\text{mudcake thickness, invasion radius}\} \quad (2) \text{ and,}$$

$$EM\ measurements = (f_{EM}of_{petro})(Petro\ properties, Geometry) \quad (3).$$

In some embodiments, the systems comprise a downhole tool for measuring a property of a formation and a processor for computing a direct inversion of the geometry and petrophysical information from the raw measurements. In some embodiments, the systems comprise a downhole resistivity tool, a downhole dielectric tool, or both. In some embodiments, the downole tool is a Dielectric Scanner™ available from Schlumberger. In some embodiments, the systems are configured to measure a property of the formation at different depths of investigation. In some embodiments, the depths of investigation are radial depths of investigation. In some embodiments, the processer is configured to compute the direct inversion according to formulas (1), (2), and (3) as follows:

$$\text{Direct Inversion:} \min_{Petro\ properties, Geometry} \|(EM\ measurements) - (f_{EM}of_{petro})(Petro\ properties, Geometry)\|^2 \quad (1)$$

wherein:

$$\text{Geometry:} \{\text{mudcake thickness, invasion radius}\} \quad (2) \text{ and,}$$

$$EM\ measurements = (f_{EM}of_{petro})(Petro\ properties, Geometry) \quad (3).$$

The identified embodiments are non-limiting. The details of one or more non-limiting embodiments of the disclosure are set forth in the accompanying drawings and the descriptions below. Other embodiments of the disclosure should be apparent to those of ordinary skill in the art after consideration of the present disclosure.

DETAILED DESCRIPTION

Unless defined otherwise, technical and scientific terms used herein have the same meaning as is commonly understood by one of ordinary skill in the art to which this disclosure belongs. In the event that there is a plurality of definitions for a term herein, those in this section prevail unless stated otherwise.

Where ever the phrases "for example," "such as," "including" and the like are used herein, the phrase "and without limitation" is understood to follow unless explicitly stated otherwise. Therefore, "for example a mud turbine generator" means "for example and without limitation a mud turbine generator."

The terms "comprising" and "including" and "involving" (and similarly "comprises" and "includes" and "involves") are used interchangeably and mean comprising. Specifically, each of the terms is defined consistent with the common United States patent law definition of "comprising" and is therefore interpreted to be an open term meaning "at least the following" and also interpreted not to exclude additional features, limitations, aspects, etc.

The term "about" is meant to account for variations due to experimental error. The term "substantially" is meant to permit deviations from a descriptor that does not negatively impact the intended purpose. Measurements or numbers are implicitly understood to be modified by the word about, even if the measurement or number is not explicitly modified by the word about. Similarly, descriptive terms are implicitly understood to be modified by the word substantially, even if the term is not explicitly modified by the word substantially.

Where ever the terms "a" or "an" are used, "one or more" is understood unless explicitly stated otherwise or such interpretation is nonsensical in context. For example, "a logging tool" means "one or more logging tools."

The terms "wellbore" and "borehole" are used interchangeably.

"Measurement While Drilling" ("MWD") can refer to devices for measuring downhole conditions including the movement and location of the drilling assembly contemporaneously with the drilling of the well. "Logging While Drilling" ("LWD") can refer to devices concentrating more on the measurement of formation parameters. While distinctions may exist between these terms, they are also often used interchangeably. For purposes of this disclosure MWD and LWD are used interchangeably and have the same meaning. That is, both terms are understood as related to the collection of downhole information generally, to include, for example, both the collection of information relating to the movement and position of the drilling assembly and the collection of formation parameters.

Figure 1:
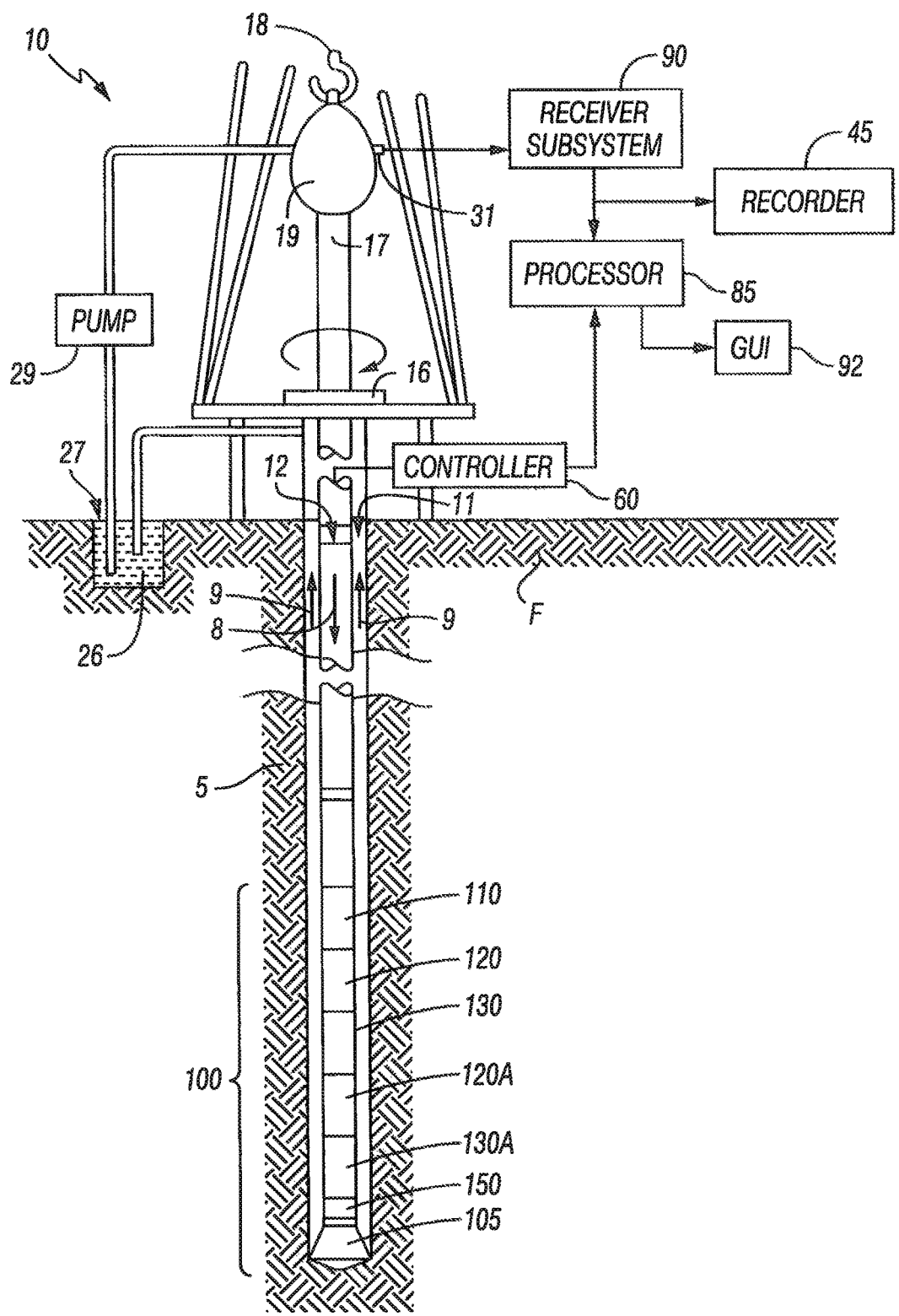
FIG. 1 is a partial schematic representation of an apparatus for logging while drilling that is compatible with the systems and methods of this disclosure.
Figure 2:
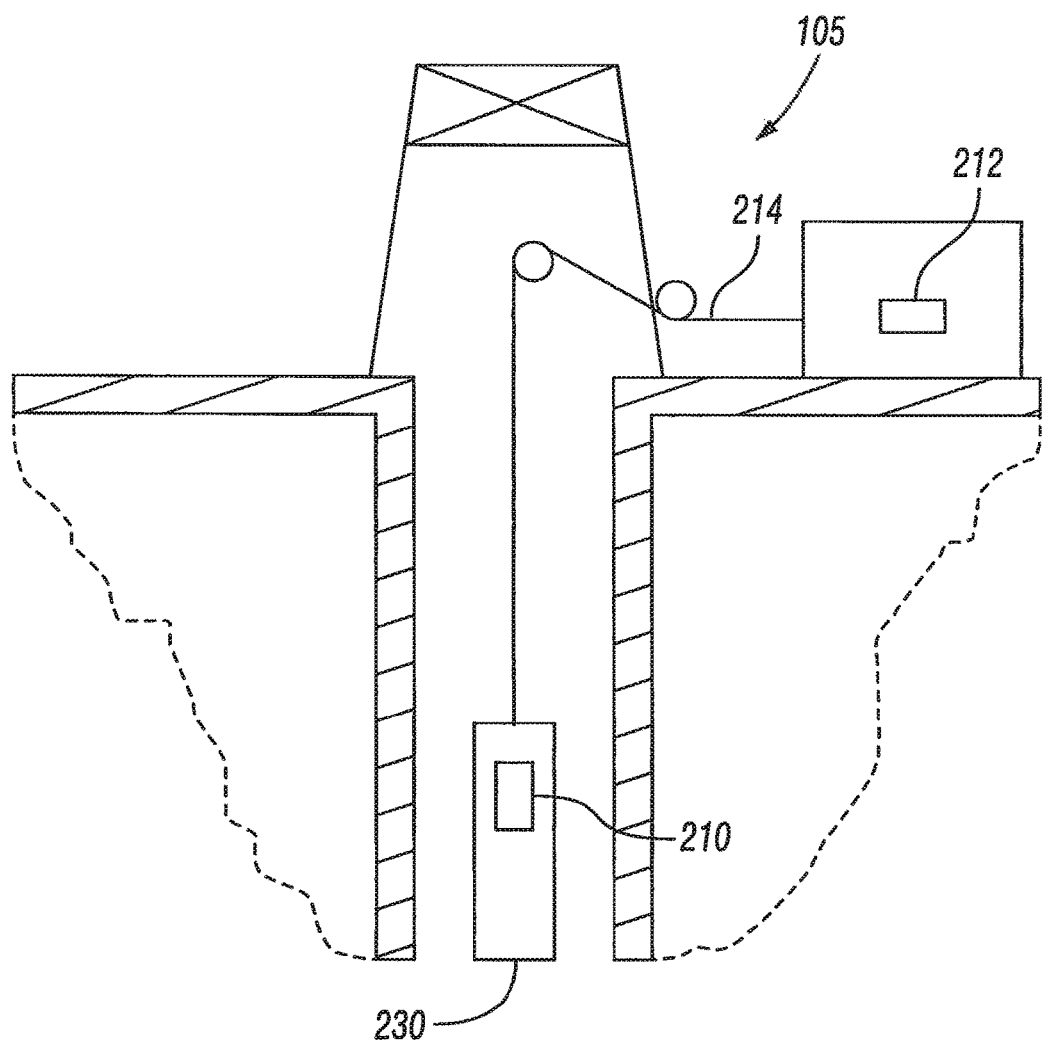
FIG. 2 is a partial schematic representation of another apparatus that is compatible with the systems and methods of this disclosure.

FIGS. 1 and 2 illustrate non-limiting, well logging systems used to obtain well logging data and other information, which may be used with systems and methods in accordance with embodiments of the present disclosure.

FIG. 1 illustrates a land-based platform and derrick assembly (drilling rig) 10 and drill string 12 with a well logging data acquisition and logging system, positioned over a wellbore 11 for exploring a formation F. In the illustrated embodiment, the wellbore 11 is formed by rotary drilling in a manner that is known in the art. Those of ordinary skill in the art given the benefit of this disclosure will appreciate, however, that the subject matter of this disclosure also finds application in directional drilling applications as well as rotary drilling, and is not limited to land-based rigs. In addition, although a logging while drilling apparatus is illustrated, the subject matter of this disclosure is also applicable to wireline drilling (for example as shown in FIG. 2).

A drill string 12 is suspended within the wellbore 11 and includes a drill bit 105 at its lower end. The drill string 12 is rotated by a rotary table 16, energized by means not shown, which engages a kelly 17 at the upper end of the drill string. The drill string 12 is suspended from a hook 18, attached to a travelling block (also not shown), through the kelly 17 and a rotary swivel 19 which permits rotation of the drill string 12 relative to the hook 18.

Drilling fluid or mud 26 is stored in a pit 27 formed at the well site. A pump 29 delivers the drilling fluid 26 to the interior of the drill string 12 via a port in the swivel 19, inducing the drilling fluid to flow downwardly through the drill string 12 as indicated by the directional arrow 8. The drilling fluid exits the drill string 12 via ports in the drill bit 105, and then circulates upwardly through the region between the outside of the drill string 12 and the wall of the wellbore, called the annulus, as indicated by the direction arrows 9. In this manner, the drilling fluid lubricates the drill bit 105 and carries formation cuttings up to the surface as it is returned to the pit 27 for recirculation.

The drill string 12 further includes a bottomhole assembly ("BHA"), generally referred to as 100, near the drill bit 105 (for example, within several drill collar lengths from the drill bit). The BHA 100 includes capabilities for measuring, processing, and storing information, as well as communicating with the surface. The BHA 100 thus may include, among other things, one or more logging-while-drilling ("LWD") modules 120, 120A and/or one or more measuring-while-drilling ("MWD") modules 130, 130A. The BHA 100 may also include a roto-steerable system and motor 150.

The LWD and/or MWD modules 120, 120A, 130, 130A can be housed in a special type of drill collar, as is known in the art, and can contain one or more types of logging tools for investigating well drilling conditions or formation properties. The logging tools may provide capabilities for measuring, processing, and storing information, as well as for communication with surface equipment.

The BHA 100 may also include a surface/local communications subassembly 110, which may be configured to enable communication between the tools in the LWD and/or MWD modules 120, 120A, 130, 130A and processors at the earth's surface. For example, the subassembly may include a telemetry system that includes an acoustic transmitter that generates an acoustic signal in the drilling fluid (a.k.a. "mud pulse") that is representative of measured downhole parameters. The acoustic signal is received at the surface by instrumentation that can convert the acoustic signals into electronic signals. For example, the generated acoustic signal may be received at the surface by transducers. The output of the transducers may be coupled to an uphole receiving system 90, which demodulates the transmitted signals. The output of the receiving system 90 may be coupled to a computer processor 85 and a recorder 45. The computer processor 85 may be coupled to a monitor, which employs graphical user interface ("GUI") 92 through which the measured downhole parameters and particular results derived therefrom are graphically or otherwise presented to the user. In some embodiments, the data is acquired real-time and communicated to the back-end portion of the data acquisition and logging system. In some embodiments, the well logging data may be acquired and recorded in the memory in downhole tools for later retrieval.

The LWD and MWD modules 120, 120A, 130, 130A may also include an apparatus for generating electrical power to the downhole system. Such an electrical generator may include, for example, a mud turbine generator powered by the flow of the drilling fluid, but other power and/or battery systems may be employed additionally or alternatively.

The well-site system is also shown to include an electronics subsystem comprising a controller 60 and a processor 85, which may optionally be the same processor used for analyzing logging tool data and which together with the controller 60 can serve multiple functions. For example the controller 60 and processor 85 may be used to power and operate the logging tools used for collecting raw measurements from which geometry and petrophysical information may be derived. The controller and processor need not be on the surface as shown but may be configured in any way known in the art. For example, alternatively, or in addition, as is known in the art, the controller and/or processor may be part of the MWD (or LWD) modules on which, for example, the logging tool is positioned, or may be on-board the tool itself.

In the methods and systems according to this disclosure, the electronics subsystem (whether located on the surface or sub-surface on or within the tool or some combination thereof) includes a processor and a memory containing machine-readable instructions for execution by the processor, and which when executed by the processor perform one or more of the calculations, analytics and evaluations disclosed herein.

FIG. 2 illustrates a wireline logging system 205 suitable for use with the systems and methods of this disclosure. As shown in FIG. 2, a transmitter 210 receives the acquired well logging data from a sensor included in the wireline tool 230. The transmitter 210 communicates the acquired well logging data to a surface processer 212 via a logging cable 214. The logging cable 214 is commonly referred to as a wireline cable. In some embodiments, the processor 212 or a back-end portion (not shown) of the wireline logging system may include a computer system to process the acquired well logging data.

Non-limiting examples of logging tools that may be useful for generating data useful in systems and methods according to embodiments of the present disclosure include the Dielectric Scanner™, which is owned and offered through logging services by Schlumberger, the assignee of the present application, as well as Schlumberger's ARC™ (Array Resistivity Compensated) dielectric tool and Schlumberger's EPT™ (Electromagnetic Propagation) dielectric tool. However, any tool that may be used to acquire data relating to a formation property at multiple depths of investigation may also be used in the systems and methods according to this disclosure.

The logging tools referred to in the previous paragraph may be used to generate data, such as dielectric data relating to the resistivity, conductivity or permittivity of a formation, which facilitate inferring properties of the rock surrounding a borehole. For example, a Dielectric Scanner™ provides dielectric measurements of conductivity and permittivity at multiple spacings (i.e. different distances between emitters and receiver) and at several frequencies.

Figure 3:
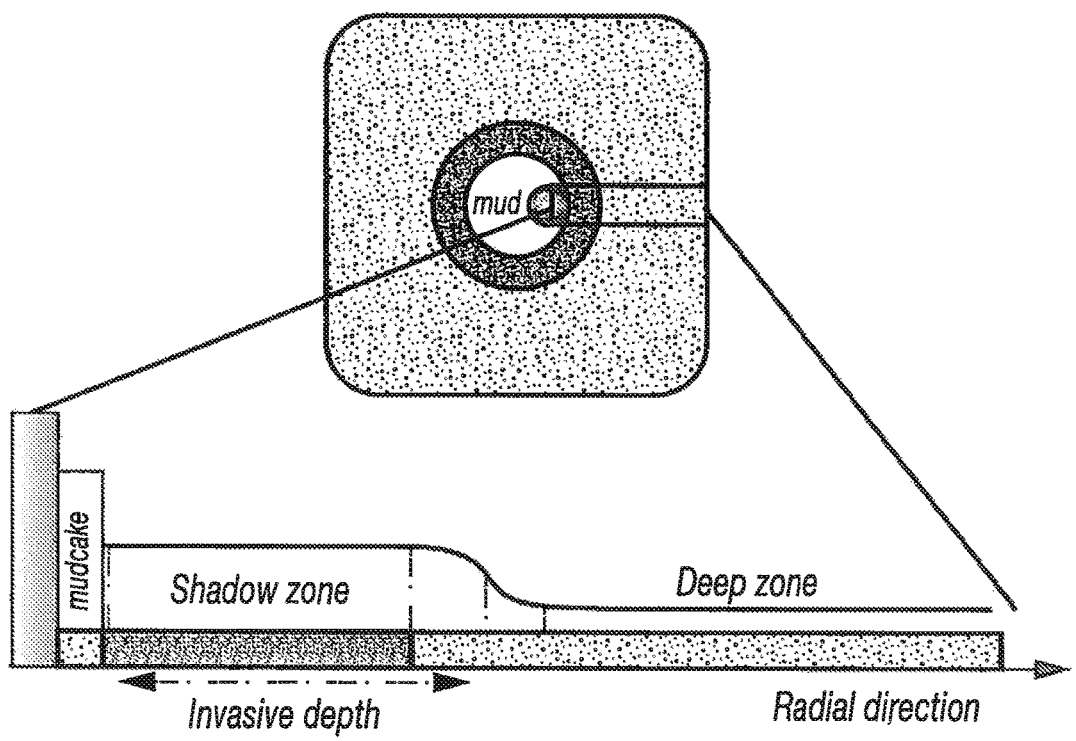
FIG. 3 is a schematic representation of a logging model composed of concentric radial layers.
Figure 3:
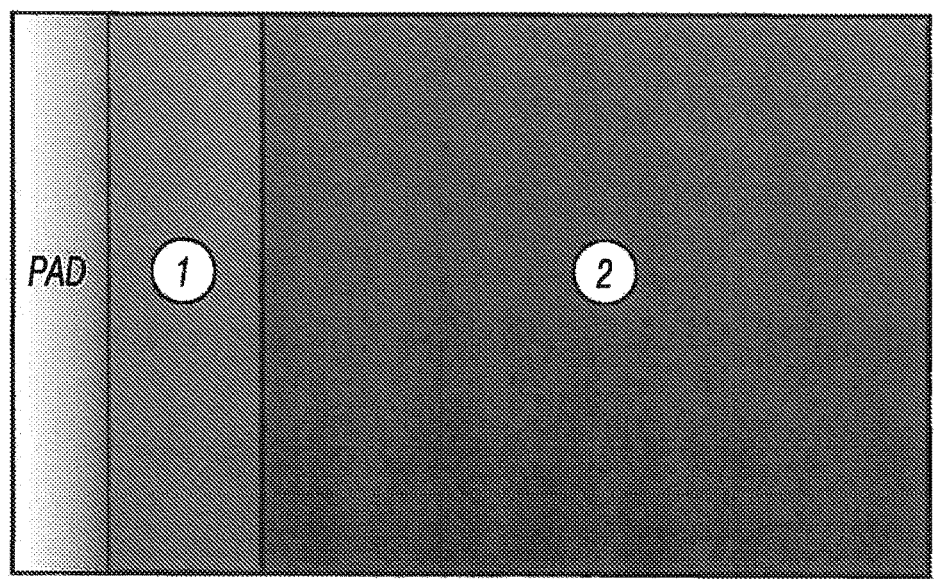

Referring to FIG. 3, a stylized, basic model of a radial inversion profile a formation is illustrated. The model of FIG. 3 includes: a thin, mudcake zone 3, which thickness is generally less than one inch; a shallow, invaded zone 1 (h indicates the invasion radius) containing the rock invaded by the mud filtrate; and a deep, virgin zone 3. The shallow zone has properties of, for example, permittivity ($\varepsilon_1$) and conductivity ($\sigma_1$) and the deep zone has properties of, for example, permittivity ($\varepsilon_2$) and conductivity ($\sigma_2$). Downhole dielectric tools, which may provide data relating to one or more of resistivity, conductivity, permittivity, can provide numerous measurements containing a large wealth of information, including radial information. The inversion procedure attempts to use such measurements to develop a numerical estimation of parameters characterizing the formation. Radial inversion, for example, is used to estimate properties of one or more radial zones such as illustrated in FIG. 3.

The typical inversion workflow includes two sequential steps. A first step aims at inverting for electromagnetic properties (e.g., resistivity for resistivity tools, dielectric properties such as permittivity and conductivity, for dieletric tools) of the different zones surrounding the borehole from the raw measurements. A second step aims at inverting for the petrophysical properties of the different zones surrounding the borehole from the previously inverted electromagnetic properties. However, the methods according to this disclosure directly invert for the geometry of the formation and petrophysical properties of the formation from the raw measurements. For example, the methods involve calculating desired geometry and petrophysical information according to the following formulas (1), (2) and (3):

$$\text{Direct Inversion:} \min_{Petro\ properties, Geometry} \|(\text{EM measurements}) - (f_{EM} \circ f_{petro})(\text{Petro properties, Geometry})\|^2 \quad (1)$$

wherein:

$$\text{Geometry:} \{\text{mudcake thickness, invasion radius}\} \quad (2) \text{ and,}$$

$$\text{EM measurements} = (f_{EM} \circ f_{petro})(\text{Petro properties, Geometry}) \quad (3).$$

A person of skill in the art, basis reading this disclosure, understands that the direct inversion model above (formulas 1-3) can be implemented in a variety of ways, depending upon the formation properties of interest and the downhole tool used. For example, the equations involve the use of a variety of petrophysical function models, and a variety of electromagnetic (EM) function models. As will be understood, the chosen model will depend on the number of parameters of interest and the specific tool or tools which are used to collect the measurements for evaluating the parameters of interest. For example, Archie's model is one petrophysical function that may be used with resistivity tools, whereas Complex Refractive Index Method (CRIM), and/or the Stroud Dispersion model may be used with dielectric tools. Additionally, a relatively simple model can be used for example if solving for a minimal number of parameters, such as volume of water and salinity of water. A relatively more complex model may be used if there are additional parameters of interest such as textural parameters.

With regard to EM models, the EM function may model the measurement from the geometry to the EM properties of each radial zone (can also be modified for application to vertical zones). Complex geometry may be modeled, such as where the tool is an eccentered cylinder pressed against the cylinder bore. In such a case, the geometry properties may be the borehole diameter, the standoff, the thickness of each radial zone (mudcake, shallow or invaded zone, deep or virgin zone). In some embodiments, some geometry parameters may be assumed to be known and not inverted (e.g. borehole diameter, the input EM properties of the drilling mud and of the different radial zones). As well, some EM parameters may be assumed to be known and not inverted (e.g. drilling mud properties). In some embodiments, the EM function may be simple by simplifying the geometry: for example, the influence of the deep zone could be neglected and removed, or the tool could be centered for symmetry purposes.

In some embodiments, constraints may optionally be imposed on the calculations, such as: constraints on salinity (minimum, maximum), constraints on salinity ordering (salinity of the invaded zone is lower/higher than the one in the virgin zone), constraints on the water porosity (minimum, maximum), constraints on the water porosity ordering (water porosity of the invaded zone is lower/higher than the one in the virgin zone) among other possibilities. In embodiments wherein constraints are used, as a person of skill understands, the choice of constraints generally depends on the petrophysical properties being evaluated and the petrophysical model being used.

In some embodiments, direct inversion may be launched. Then, a classical inversion technique may be used with initialization or/and a priori given by the first inversion. to the use of direct inversion and then classical inversion may improve the final results without imposing specific petrophysical parameters.

Thus, in embodiments according to this disclosure, systems for evaluating geometry and petrophysical information of formations under investigation directly from raw logging tool measurements may include a downhole logging tool (such as previously disclosed herein, for example the Schlumberger Dielectric Scanner™) configured to gather data relating to formation properties at different depths of investigation, such as different radial depths, and an electronics subsystem including a processor and a memory containing instructions for execution by the processor, which if executed result in performing a direct inversion of desired geometry and petrophysical information of the formation directly from the raw measurements (or as is implicitly understood a subset of the raw measurements) gathered by the logging tool or tools. For example, the direct inversion may involve calculations according to formulas (1), (2) and (3) disclosed herein.

And, methods in accordance with this disclosure for evaluating formation geometry and petrophysical properties directly from raw measurements, involves using a logging tool or tools to measure data relating to a formation property at different depths of investigation, and evaluating the measurements using a direct inversion process which extracts formation geometry and petrophysical information directly from the raw measurements, for example without first inverting for electromagnetic properties. In some embodiments, the tool or tools measure properties at different radial depths of investigation. Evaluating the measurements comprises calculating geometry and petrophysical information according to formulas (1), (2) and (3) provided herein.

While the detailed description has been made with respect to a limited number of embodiments, those skilled in the art, having the benefit of this disclosure, will appreciate numerous modifications and variations there from. It is intended that the appended claims cover such modifications and variations as fall within the true spirit and scope of this disclosure. Accordingly, other embodiments are included as part of the disclosure and may be encompassed by the attached claims. Furthermore, the foregoing description of various embodiments does not necessarily imply exclusion. For example, "some" embodiments or "other" embodiments may include all or part of "some", "other" and "further" embodiments within the scope of this disclosure.

What is claimed is:

1. A method of evaluating properties of a formation, comprising:
    a. using a downhole tool in a well to acquire raw electromagnetic measurements at multiple radial depths of investigation, wherein the raw electromagnetic measurements are representative of one or more of resistivity, conductivity or permittivity of the formation; and,
    b. directly calculating information relating to the formation geometry and one or more petrophysical properties from the raw measurements or a subset thereof, wherein directly calculating includes performing a direct inversion for the geometry of the formation and petrophysical properties of the formation from the raw measurements or a subset thereof,
    c. generating a model of an invasion profile of the formation based on the direct inversion.

2. A method according to claim 1, wherein calculating information is a direct inversion according to formulas (1), (2) and (3):

$$\text{Direct Inversion:} \min_{\text{Petro properties, Geometry}} \|(EM \text{ measurements}) - \quad (1)$$

$$(f_{EM} \text{ of}_{petro})(\text{Petro properties, Geometry})\|^2$$

wherein:

$$\text{Geometry:} \{\text{mudcake thickness, invasion radius}\} \quad (2) \text{ and,}$$

$$EM \text{ measurements} = (f_{EM} \text{of}_{petro})(\text{Petro properties, Geometry}) \quad (3).$$

3. A method according to claim 2, wherein the downhole tool is a tool that measures a dielectric property of the formation over multiple frequencies.

4. The method according to claim 1, wherein the petrophysical properties include one or more of volume of water and salinity of water or water porosity.

5. The method according to claim 1, wherein the information relating to the formation geometry include one or more of borehole diameter, standoff, the thickness of each radial zone.

6. A system for evaluating formation properties, comprising:
    a. a downhole tool for acquiring raw electromagnetic measurements at multiple radial depths of investigation, wherein the raw electromagnetic measurements are representative of one or more of resistivity, conductivity or permittivity of the formation; and,
    b. an electronics subsystem for computing information relating to geometry and one or more petrophysical properties using a direct inversion for the geometry of the formation and petrophysical properties of the formation of the raw electromagnetic measurements or a subset thereof and for generating a model of an invasion profile of the formation based on the direct inversion.

7. A system according to claim 6, wherein the downhole tool measures formation dielectric properties over multiple frequencies.

8. A system according to claim 6, wherein the electronics subsystem comprises a processor and machine readable instructions for execution by the processor, which when executed compute the information.

9. A system according to claim 8, wherein computing involves performing calculations according to formulas (1), (2) and (3) as follows:

$$\text{Direct Inversion:} \min_{\text{Petro properties, Geometry}} \|(EM \text{ measurements}) - \quad (1)$$

$$(f_{EM} \text{ of}_{petro})(\text{Petro properties, Geometry})\|^2$$

wherein:

$$\text{Geometry:} \{\text{mudcake thickness, invasion radius}\} \quad (2) \text{ and,}$$

$$EM \text{ measurements} = (f_{EM} \text{of}_{petro})(\text{Petro properties, Geometry}) \quad (3).$$

10. The system according to claim 6, wherein the petrophysical properties include one or more of volume of water and salinity of water or water porosity.

11. The system according to claim 6, wherein the information relating to the formation geometry include one or more of borehole diameter, standoff, the thickness of each radial zone.

* * * * *